United States Patent

Choo et al.

(10) Patent No.: US 8,081,273 B2
(45) Date of Patent: Dec. 20, 2011

(54) LIQUID CRYSTAL DISPLAY

(75) Inventors: Dae Ho Choo, Seongnam-Si (KR); Yang Suk Ahn, Yongin-Si (KR); Yeong Hee Yu, Suwon-Si (KR)

(73) Assignee: Samsung Electronics Co., Ltd. (KR)

( * ) Notice: Subject to any disclaimer, the term of this patent is extended or adjusted under 35 U.S.C. 154(b) by 356 days.

(21) Appl. No.: 11/924,533

(22) Filed: Oct. 25, 2007

(65) Prior Publication Data

US 2008/0100781 A1   May 1, 2008

(30) Foreign Application Priority Data

Oct. 26, 2006   (KR) .................. 10-2006-0104251

(51) Int. Cl.
*G02F 1/335* (2006.01)
(52) U.S. Cl. .......................... 349/96; 349/100
(58) Field of Classification Search .............. 349/96, 349/100
See application file for complete search history.

(56) References Cited

U.S. PATENT DOCUMENTS

| | | | |
|---|---|---|---|
| 5,299,289 A | 3/1994 | Omae et al. | |
| 6,288,840 B1 | 9/2001 | Perkins et al. | |
| 6,426,837 B1 | 7/2002 | Clark et al. | |
| 6,798,464 B2 * | 9/2004 | Bietsch et al. | 349/12 |
| 6,831,709 B2 * | 12/2004 | Yamada et al. | 349/44 |
| 7,046,442 B2 | 5/2006 | Suganuma | |
| 7,480,017 B2 * | 1/2009 | Fisher et al. | 349/96 |
| 2002/0118327 A1 * | 8/2002 | Yamada et al. | 349/113 |
| 2002/0167619 A1 * | 11/2002 | Bietsch et al. | 349/1 |
| 2002/0176029 A1 * | 11/2002 | Fujino | 349/43 |
| 2003/0169382 A1 * | 9/2003 | Fujino | 349/43 |
| 2004/0264350 A1 | 12/2004 | Ueki et al. | |
| 2005/0088739 A1 | 4/2005 | Chiu et al. | |
| 2006/0061519 A1 * | 3/2006 | Fisher et al. | 345/32 |
| 2007/0076143 A1 * | 4/2007 | Palk et al. | 349/96 |
| 2007/0242195 A1 * | 10/2007 | Kuan et al. | 349/113 |

FOREIGN PATENT DOCUMENTS

| | | |
|---|---|---|
| JP | 5-88142 | 4/1993 |
| JP | 5-88153 | 4/1993 |
| JP | 9-160013 | 6/1997 |
| JP | 11-249074 | 9/1999 |
| JP | 2003-519818 | 6/2003 |
| JP | 2005-338882 | 12/2005 |
| KR | 100253768 | 1/2000 |
| KR | 1020040061498 | 7/2004 |
| KR | 1020040084968 | 7/2004 |
| KR | 1020050001471 | 1/2005 |
| KR | 1020060079705 | 7/2006 |

* cited by examiner

*Primary Examiner* — K. Cyrus Kianni
(74) *Attorney, Agent, or Firm* — Innovation Counsel LLP

(57) ABSTRACT

The present invention relates to a liquid crystal display (LCD) and a method of manufacturing the same. In the present invention, a wire grid polarizing pattern is formed on at least one of thin film transistor and color filter substrates in a manufacturing process thereof. According to the present invention, the thickness of an LCD panel can be reduced as compared with a method of attaching an existing polarizer to an LCD panel, and the wire grid polarizing pattern can be built in an LCD panel without increasing the number of masking processes.

8 Claims, 12 Drawing Sheets

LIQUID CRYSTAL DISPLAY

REFERENCE TO RELATED APPLICATIONS

This application claims the benefit of Korean patent application No. 10-2006-0104251 filed in the Korean Intellectual Property Office on Oct. 26, 2006

BACKGROUND OF THE INVENTION

1. Field of Invention

The present invention relates to a liquid crystal display (LCD), and more particularly, to an LCD in which a wire grid polarizer is formed on at least one of a thin film transistor substrate and a color filter substrate.

2. Description of the Prior Art

A liquid crystal display (LCD) comprises a thin film transistor (TFT) substrate with a pixel electrode formed thereon, a color filter substrate with a common electrode formed thereon, and a liquid crystal layer interposed between the two substrates. The LCD displays an image in such a manner that liquid crystal molecules are rearranged by applying a data voltage between the pixel and common electrodes to vary the amount of light transmitted through the liquid crystal layer. Since such an LCD is not self-luminescent, an image is displayed by means of light incident from the outside. To this end, a backlight unit is mounted to a rear surface of the LCD.

Light radiated from the backlight unit is not incident directly onto an LCD panel but incident with a polarization characteristic provided through a polarizer. Thus, an LCD displays an image using the optical anisotropy of liquid crystal molecules and the polarization characteristic of a polarizer.

An existing method of mounting a polarizer on an LCD panel includes attaching a polymer-type polarizer to the outside of an LCD panel. In a representative method, iodine molecules are chemically bonded on a polyvinylalcohol (PVA) base film in a predetermined direction through a wet stretching method to impart the polarization characteristic. While such a polarizer has a superior polarization characteristic, its manufacture requires an additional process besides those involved in manufacturing the LCD thereby increasing manufacturing cost.

Further, the existing attachable polarizer cannot provide polarization for each pixel of an LCD panel because the polarization characteristic are obtained by chemically bonding iodine molecules on the polyvinylalcohol (PVA) base film in a predetermined direction through wet stretching—resulting in the iodine molecules having a directional property throughout the entire film. Thus, polarization cannot be individually provided for each pixel of an LCD.

Further, since an attachable polarizer requires the use of an adhesive agent, the thickness of the LCD panel is increased due to the thicknesses of the adhesive agent.

Unlike the aforementioned polymer type polarizer, a small-sized wire grid polarizer has been developed and applied to products such as projectors. In the wire grid polarizer, a stripe pattern with a line width and interval smaller than the wavelength of red, green or blue light is formed on a base substrate. The wire grid polarizer is formed of a metal such as Al through a thin film machining method. That is, a wire grid polarizing pattern is formed with a line width and interval of 50 to 200 nm smaller than the blue light region that is the minimum optical wavelength of visual light. In an LCD, light incident on the wire grid polarizing pattern formed in such a manner from a backlight unit, the light advances while vibrating in horizontal and vertical directions with respect to its direction of advance. For this reason, only the light incident while vibrating in parallel with the spaces between regions in which the wire grid polarizing pattern is formed passes through. A wire grid polarizer is a structure in which the metal-based wire grid polarizing pattern is formed in such a manner.

If such a wire grid polarizer is formed of a metallic material such as Al with optically high reflectivity, the light incident from a backlight unit while vibrating in a vertical direction with respect to the spaces between the regions in which the wire grid polarizing pattern is formed does not pass through and is reflected back to the backlight unit. Thus, if a phase transition layer with reflectivity different from the wire grid polarizer, e.g., an anti-reflective layer, is formed under the wire grid polarizer, a phase shift occurs in the phase transition layer and the light is again incident to the wire grid polarizer, whereby an additional polarization occurs.

The wire grid polarizer has the same effect as a dual brightness enhancement film (DBEF) in which light recycling described above continuously occurs, so that polarization transmittance is enhanced. Since the light recycling can be obtained without using the complicated DBEF but by using a simple anti-reflective structure, a low-priced polarizer with high polarization can be manufactured.

However, the wire grid polarizer should be attached to the outside of an LCD panel like the existing polymer type polarizer after being manufactured through an additional manufacturing process. Therefore, such a wire grid polarizer is more expensive than a film attachable polarizer in view of costs and the number of the entire processes.

SUMMARY OF THE INVENTION

According to one aspect of present invention a liquid crystal display (LCD) having a wire grid polarizer is formed when manufacturing the LCD panel, whereby the thickness of the LCD panel is reduced as compared with an attachable polarizer and the cost and the number of processes of the LCD panel can be reduced.

According to an aspect of the present invention an LCD, comprises upper and lower substrates with predetermined element layers respectively formed thereon; and a liquid crystal layer interposed between the upper and lower substrates, wherein a wire grid polarizing pattern with a predetermined line width and interval is formed on at least one of the upper and lower substrates.

The wire grid polarizing pattern may be formed on a surface of each of the upper and lower substrates, or on the same plane as the element layer of the upper or lower substrate.

The LCD may further comprise a light conversion layer formed under the wire grid polarizing pattern.

According to another aspect of the present invention, there is provided an LCD comprising a thin film transistor (TFT) substrate having a gate line extending in one direction on a first substrate, a data line extending in a direction perpendicular to the gate line and a pixel electrode at a pixel region defined by the gate and data lines; and a color filter substrate having a black matrix formed to correspond to a region except the pixel region, a color filter formed corresponding to the pixel region and a common electrode, wherein a wire grid polarizing pattern with a predetermined line width and interval is formed on at least one substrate of the TFT and color filter substrates.

The wire grid polarizing pattern may be formed of a reflection material.

The wire grid polarizing pattern may be formed under the gate line, on the same plane as the gate line, or on the same plane as the data line.

The wire grid polarizing pattern may be primarily formed under the gate line and secondarily formed on the same plane as the gate line.

The wire grid polarizing pattern may be primarily formed under the gate line and secondarily formed on the same plane as the data line.

The wire grid polarizing pattern may be primarily formed on the same plane as the gate line and secondarily formed on the same plane as the data line.

The secondarily formed wire grid polarizing pattern may be formed on a space between regions in which the primarily formed wire grid polarizing pattern is formed.

The LCD wire grid polarizing pattern may be formed under the black matrix or on the same plane as the black matrix.

The wire grid polarizing pattern may be primarily formed under the black matrix and secondarily formed on the same plane as the black matrix.

The secondarily formed wire grid polarizing pattern may be formed on a space between regions in which the primarily formed wire grid polarizing pattern is formed.

The LCD may further comprise a light conversion layer formed under the wire grid polarizing pattern. Here, the light conversion layer is formed on a predetermined substrate or thin film and attached to a bottom surface of at least one of the first and second substrates, or on a bottom surface of at least one of the first and second substrates by depositing a predetermined film thereon.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE PREFERRED EMBODIMENT

Figure 1:
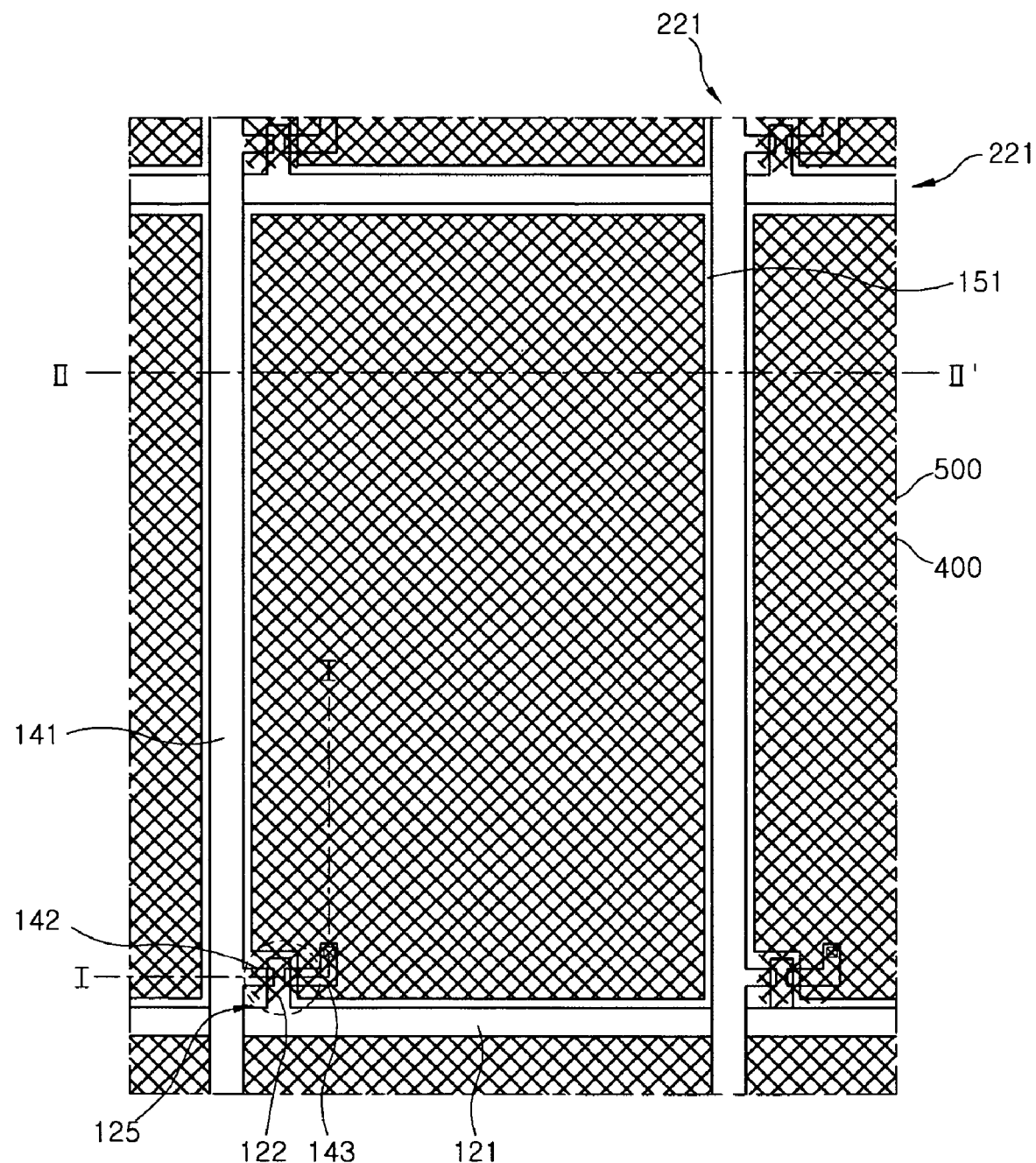
FIG. 1 is a plan view schematically showing a liquid crystal display (LCD) panel according to the present invention.

In the drawings, the thicknesses of layers and regions are exaggerated for clarity thereof, and like reference numerals are used to designate like elements throughout the specification and drawings. Further, the expression that an element such as a layer, region, substrate or plate is placed on or above another element includes not only a case where the element is placed directly on or just above the other element but also a case where a further element is interposed between the element and the other element.

Figure 2:
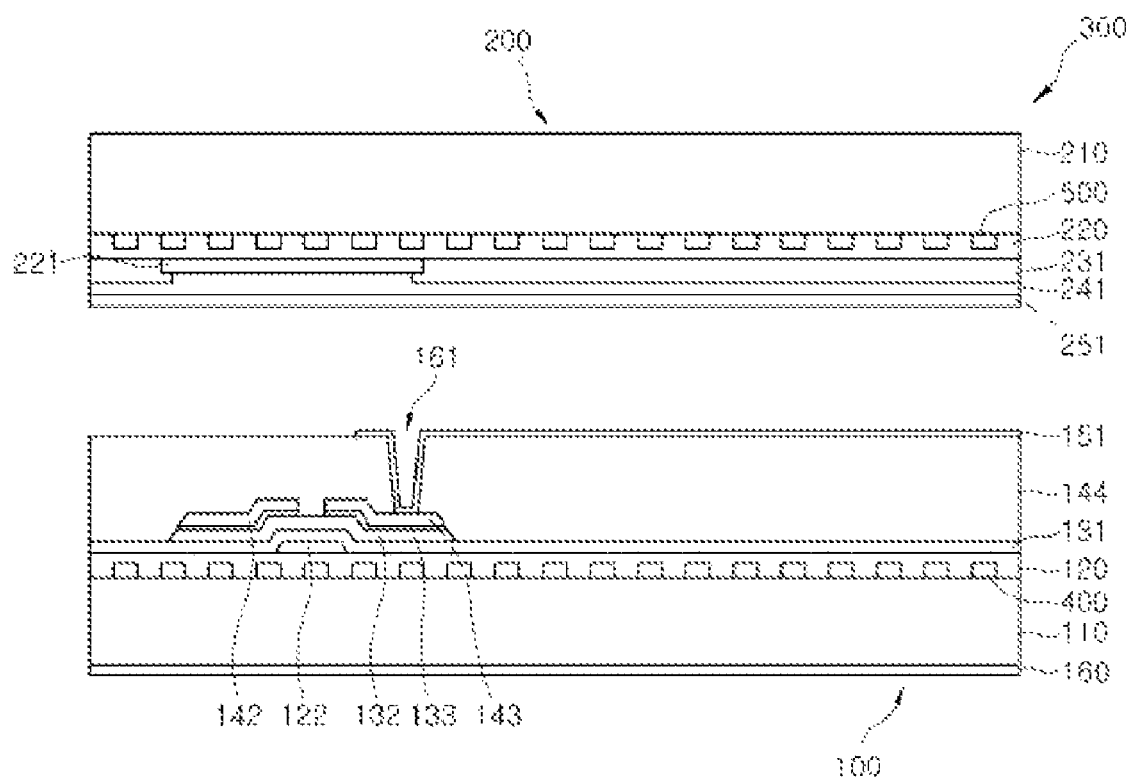
FIG. 2 is a sectional view taken along line I-I' in FIG. 1.
Figure 3:
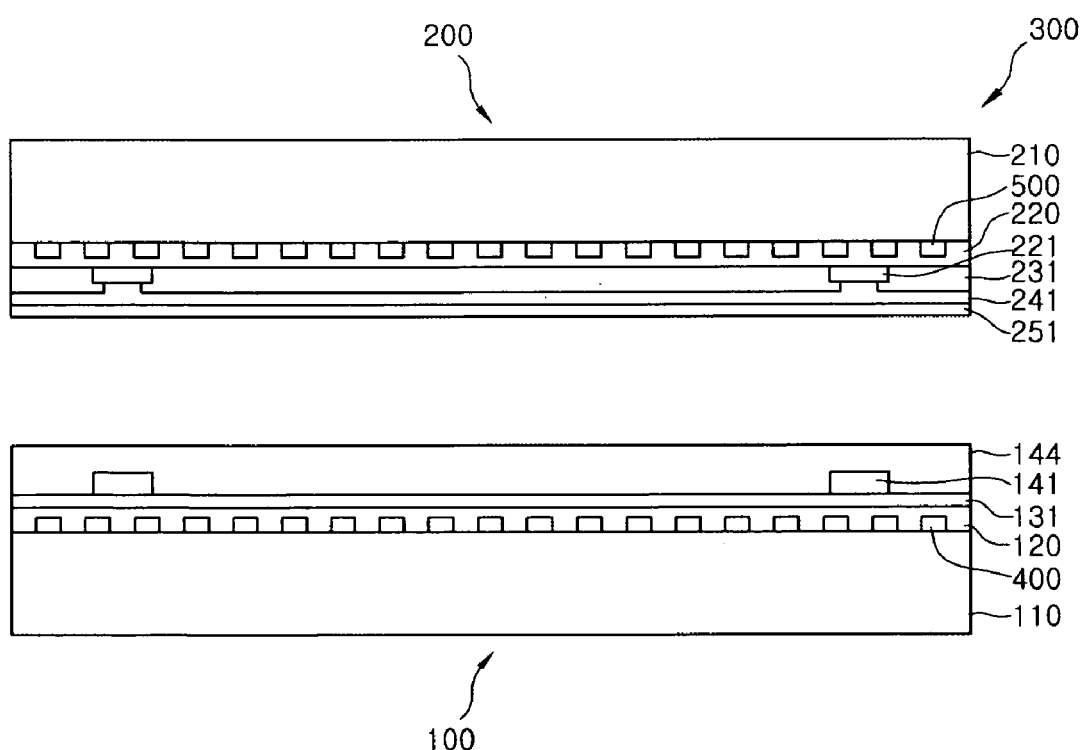
FIG. 3 is a sectional view taken along line II-II' in FIG. 1.

FIG. 1 is a plan view schematically showing a liquid crystal display (LCD) panel according to the present invention, FIG. 2 is a sectional view taken along line I-I' of the LCD panel in FIG. 1, and FIG. 3 is a sectional view taken along line II-II' in FIG. 1.

Referring to FIGS. 1 to 3, an LCD panel 300 includes a thin film transistor (TFT) substrate 100 and a color filter substrate 200 facing each other, and a liquid crystal layer (not shown) interposed therebetween. Further, the LCD panel 300 further includes at least one of a first wire grid polarizing pattern 400 formed in one direction on an entire surface or pixel regions of the TFT substrate 100, and a second wire grid polarizing pattern 500 formed in a direction vertical to the first wire grid polarizing pattern 400 on an entire surface of the color filter substrate 200 or regions thereof corresponding to the pixel regions of the TFT substrate 100.

The TFT substrate 100 includes a plurality of gate lines 121 extending in one direction on a first insulation substrate 110; a plurality of data lines 141 intersecting the gate lines 121; pixel electrodes 151 formed at the pixel regions defined by the gate and data lines 121 and 141; and TFTs 125 connected to the gate and data lines 121 and 141 and the pixel electrodes 151. Further, the TFT substrate 100 further includes the first wire grid polarizing pattern 400 formed in the one direction to have a predetermined width and interval in the pixel regions.

The gate line 121 mainly extends in an abscissa direction, and a portion of the gate line 121 protrudes in an ordinate direction to form a gate electrode 122.

The data line 141 extends in one direction to perpendicularly intersect the gate line 121, and a portion of the data line 141 protrudes to form a source electrode 142. Further, a drain electrode 143 is formed to be spaced apart from the source electrode 142 at a predetermined interval when the data line 141 is formed.

Preferably, the gate line 121 is formed of any of Al, Nd, Ag, Cr, Ti, Ta and Mo, or an alloy thereof. Further, the gate line 121 may be formed in not only a single layer but also a multi-layer including a plurality of metal layers. That is, the gate line 121 may be formed in a double-layer including a metal layer such as Cr, Ti, Ta or Mo with a superior physical and chemical characteristics and an Al- or Ag-based metal layer with low specific resistance. Further, the aforementioned data line 141, source electrode 142 and drain electrode 143 may also be formed of the aforementioned metal and in a multi-layer.

The TFT 125 allows a pixel signal supplied to the data line 141 to be charged into the pixel electrode 151 in response to a signal supplied to the gate line 121. Thus, the TFT 125 includes the gate electrode 122 connected to the gate line 121; the source electrode 142 connected to the data line 141; the drain electrode 143 connected to the pixel electrode 151; a gate insulation film 131 and an active layer 132 sequentially formed between the gate electrode 122 and the source and drain electrodes 142 and 143; and an ohmic contact layer 133 formed on at least a portion of the active layer 132. At this time, the ohmic contact layer 133 may be formed on the active layer 132 except a channel portion.

A protection film 144 is formed on the gate and data lines 121 and 141 and the TFT 125. The protection film 144 may be formed of an inorganic material such as silicone nitride or silicone oxide, and also be formed of an organic insulation film with a low permittivity. It will be apparent that the protection film 144 may be formed in a double-layer including inorganic and organic insulation films.

The pixel electrodes 151 are formed on the substrate 110 in the pixel regions defined by the gate and data lines 121 and 141 and connected to the drain electrodes 143.

The first wire grid polarizing pattern 400 is formed on the entire surface or the pixel regions of the TFT 100, and may be formed in an abscissa or ordinate direction or an inclined direction at a predetermined angle with respect to the gate line 121. As shown in the figures, the first wire grid polarizing pattern 400 may be formed on the substrate 110 before the gate lines 121 are formed. In addition, the first wire grid polarizing pattern 400 may be formed simultaneously with the gate lines 121 or the data lines 141. Further, the first wire grid polarizing pattern 400 may be primarily formed before the gate lines 121 are formed, and secondarily formed simultaneously with the gate lines 121. Alternatively, the first wire grid polarizing pattern 400 may be primarily formed before the data lines 141 are formed, and secondarily formed simultaneously with the data lines 141. Furthermore, the first wire grid polarizing pattern 400 may be primarily formed simultaneously with the gate lines 121, and secondarily formed simultaneously with the data lines 141. When the first wire grid polarizing pattern 400 is formed twice, it is preferred that the secondarily formed first wire grid polarizing pattern be positioned in spaces between regions in which the primarily formed first wire grid polarizing pattern is formed. In this case, it is preferred that the spaces between the regions in which the primarily formed first wire grid polarizing pattern is formed be wider than the line width of the secondarily formed first wire grid polarizing pattern, so that light can easily pass through. That is, the spaces between the regions in which the primarily formed first wire grid polarizing pattern is formed are set to be about twice a predetermined width and the secondarily formed first wire grid polarizing pattern is preferably set to have the same size as the primarily formed first wire grid polarizing pattern, so that the secondarily formed first wire grid polarizing pattern is positioned in the spaces between the regions in which the primarily formed first wire grid polarizing pattern is formed.

A storage line (not shown) may be formed to allow a liquid crystal voltage applied to the liquid crystal layer (not shown) interposed between the TFT and color filter substrates 100 and 200 to be stably maintained. For example, the storage line may be formed in the direction parallel with the gate lines 121 when the gate lines 121 are formed.

The color filter substrate 200 includes a black matrix 221, color filters 231, an overcoat film 241 and a common electrode 251, which are formed on a second insulation substrate 210. Further, the color filter substrate 200 further includes the second wire grid polarizing pattern 500 formed on the entire surface of the color filter substrate 200 or in the regions thereof corresponding to the pixel regions of the TFT substrate 100. Preferably, the second wire grid polarizing pattern 500 is formed in the direction perpendicular to the first wire grid polarizing pattern 400 in regions corresponding to the regions in which the first wire grid polarizing pattern 400 is formed.

The black matrix 221 is formed in regions other than the pixel regions, and prevents light leakage which would interfere with adjacent pixel regions. That is, the black matrix 221 has openings through which the regions in which the pixel electrodes 151 are formed.

The color filters 231 are formed such that red, green and blue filters are repeated with the black matrix 221 being as boundaries. The color filter 231 serves to provide color to light emitted from a light source and then passing through the liquid crystal layer (not shown). The color filter 231 may be formed of a photosensitive organic material.

The overcoat film 241 is formed on the color filters 221 and the black matrix 221 uncovered with the color filters 221. The overcoat film 241 serves to protect the color filters 231 and insulate between upper and lower conductive layers while flattening the color filters 231. Further, the overcoat film 241 may be formed of an acryl based epoxy material.

The common electrode 251 is formed on the overcoat film 241. The common electrode 251 is made of a transparent conductive material such as ITO (Indium Tin Oxide) or IZO (Indium Zinc Oxide). The common electrode 251 supplies voltage to the liquid crystal layer (not shown) together with the pixel electrode 151 of the TFT transistor 100.

Preferably, the second wire grid polarizing pattern 500 is formed in a direction perpendicular to the first wire grid polarizing pattern 400 on the entire surface of the color filter substrate 200 or in the regions thereof corresponding to the pixel regions of the TFT substrate 100, i.e., the regions in which the color filters are formed. Further, the second wire grid polarizing pattern 500 may be formed before the black matrix 221 is formed or simultaneously with the black matrix 221. The second wire grid polarizing pattern 500 may be primarily formed before the black matrix 221 is formed and then secondarily formed simultaneously with the black matrix 221. If the second wire grid polarizing pattern 500 is formed twice, it is preferred that the secondarily formed second wire grid polarizing pattern be positioned in spaces between regions in which the primarily formed second wire grid polarizing pattern is formed. It is preferred that the spaces between the regions in which the primarily formed second wire grid polarizing pattern is formed be wider than the line width of the secondarily formed second wire grid polarizing pattern, so that light can easily pass through. That is, the spaces between the regions in which the primarily formed second wire grid polarizing pattern is formed is set to be twice wider than a desired width and the secondarily formed second wire grid polarizing pattern is preferably set to have the same size as the primarily formed second wire grid polarizing pattern, so that the secondarily formed second wire grid polarizing pattern is positioned on the spaces between the regions in which the primarily formed second wire grid polarizing pattern is formed.

Although the first wire grid polarizing pattern 400 has been described as formed on the TFT substrate 100 and the second wire grid polarizing pattern 500 is formed on the color filter substrate 200, the present invention is not limited thereto. That is, any one of the first and second wire grid polarizing patterns 400 and 500 may be formed. Further, as shown in FIG. 1, light conversion layers 160 for allowing light reflected from the wire grid polarizing pattern to be incident again upon the wire grid polarizing pattern may be further formed under the TFT and color filter substrates 100 and 200. The light conversion layers 160 may be formed by attaching or depositing a predetermined film.

As described above, the wire grid polarizing pattern is formed on at least one of the TFT and color filter substrates in the present embodiment. Since a recycling structure is applied to the wire grid polarizing pattern in view of a polarization principle, the aperture ratio of the LCD panel is not reduced although the wire grid polarizing pattern is formed in the pixel regions of the TFT substrate. That is, where light is incident to the wire grid polarizing pattern with a certain polarization angle, the light vibrating in a horizontal direction to the wire grid polarizing pattern is transmitted through the spaces between the regions in which the wire grid polarizing pattern is formed. However, the light vibrating in the perpendicular direction does not pass through the spaces between the regions in which the wire grid polarizing pattern is formed, but is reflected. Thus, the light is reflected on the light conversion layer formed under the substrate and then incident again on the wire grid polarizing pattern. Since the polarized light is entirely induced due to the light recycling repeated in such a manner, the aperture ratio is not reduced although the wire grid polarizing pattern made of a reflective metal component is formed throughout the pixel regions of the LCD panel.

Hereinafter, a variety of embodiments of forming the first wire grid polarizing pattern 400 on the TFT substrate 100 according to the present invention will be described.

FIGS. 4A to 4F are sectional views sequentially illustrating a method of manufacturing a TFT substrate with a first wire grid polarizing pattern formed thereon according to a first embodiment of the present invention.

Figure 4A:
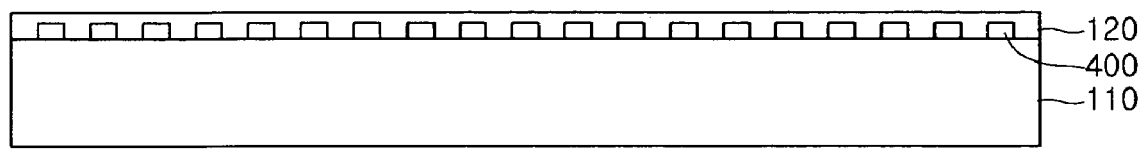
FIGS. 4A to 4F are sectional views sequentially illustrating a method of manufacturing a thin film transistor (TFT) substrate with a first wire grid polarizing pattern formed thereon according to a first embodiment of the present invention.

Referring to FIG. 4A, a first conductive layer is formed on a substrate 110, and the first conductive layer is then patterned through a photo and etching process using a first mask to form a first wire grid polarizing pattern 400 with a predetermined line width and interval. Here, a metallic or non-metallic material including Al or other reflection materials is used to form the first conductive layer for the first wire grid polarizing pattern 400. Further, the first wire grid polarizing pattern 400 is formed on an entire surface of the substrate 110 to be aligned in one direction. For example, the first wire grid polarizing pattern 400 is formed in a direction parallel with or perpendicular to a gate line 121 or in an inclined direction at a predetermined angle with respect to the gate line 121. Further, an insulation film 120 is formed on top of the substrate 120 with the first wire grid polarizing pattern 400 formed thereon. For example, the insulation film 120 is formed of a silicone oxide film.

Figure 4B:
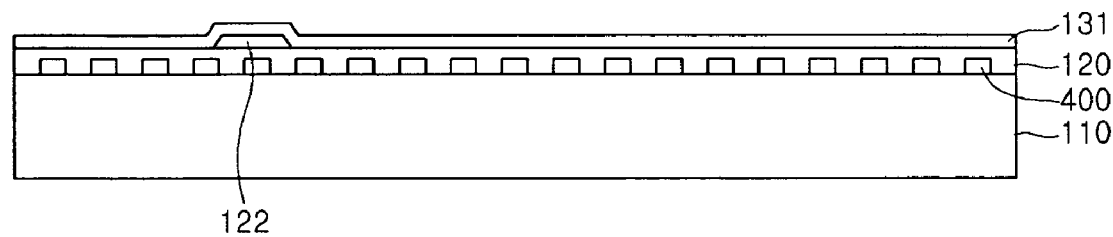

Referring to FIG. 4B, a second conductive layer is formed on top of the substrate 110 with the first wire grid polarizing pattern 400 and the insulation film 120 formed thereon, and then patterned through a photo and etching process using a second mask. Accordingly, the gate line 121 including a gate electrode 122 is formed. Further, a gate insulation film 131 is formed on top of the entire surface of the substrate 110. Here, the gate insulation film 131 is formed of an inorganic insulation film.

Figure 4C:
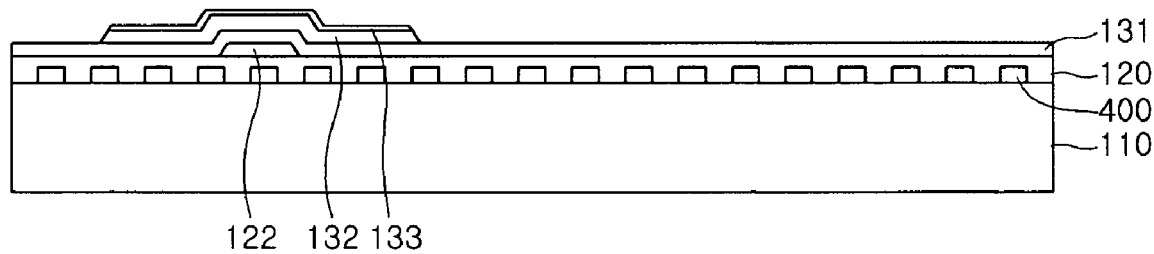

Referring to FIG. 4C, an active layer 132 and an ohmic contact layer 133 are sequentially formed on a top of the entire structure. Here, an amorphous silicone layer is used to form the active layer 132, and a silicide or amorphous silicone layer doped with highly concentrated N-type impurities is used to form the ohmic contact layer 133. Thereafter, the active layer 132 and the ohmic contact layer 133 are patterned through a photo and etching process using a third mask such that they overlap with the gate electrode 122.

Figure 4D:
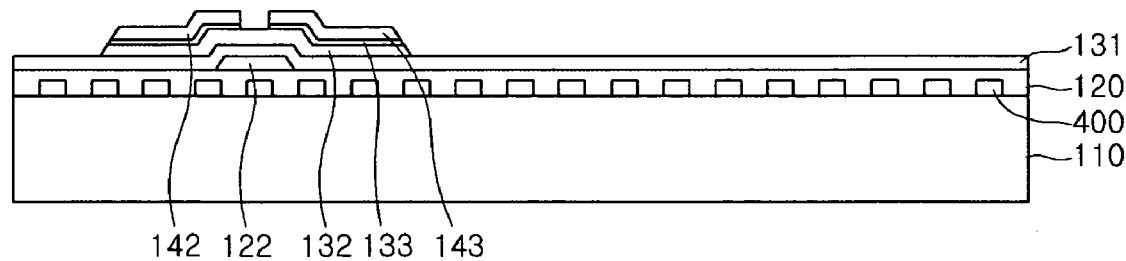

Referring to FIG. 4D, a third conductive layer is formed on top of the entire structure and then patterned through a photo and etching process using a fourth mask. Accordingly, a data line 141 as well as source and drain electrodes 142 and 143 is formed. At this time, the source and drain electrodes 142 and 143 are formed to be spaced apart from each other at a predetermined interval, and the active layer exposed by the source and drain electrodes 142 and 143 becomes a channel region. Here, it is preferred that a single or multi metal layer be used to form the third conductive layer. Further, the same material as the second conductive layer for forming the gate line 121 may be used to form the third conductive layer.

Figure 4E:
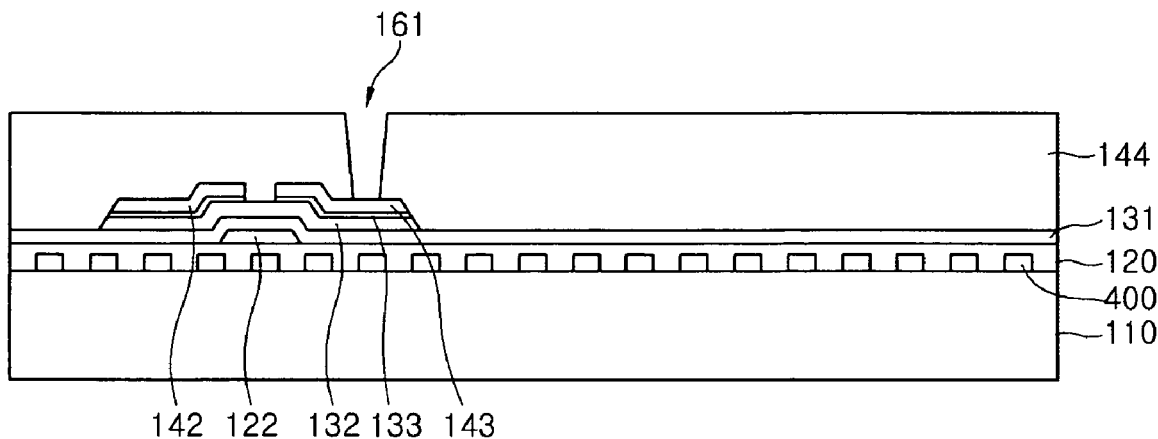

Referring to FIG. 4E, a protection film 144 is formed on top of the entire structure. The protection film 144 may be formed of an inorganic insulation film such as a silicone oxide film or nitride oxide film, or an organic insulation film such as BCB (Benzocyclobutane) or acryl resin. Further, the protection film 144 may be formed by laminating the organic and inorganic insulation films. Thereafter, a predetermined region of the protection film 144 is etched through a photo and etching process using a fifth mask to form a contact hole 161 exposing the drain electrode 143.

Figure 4F:
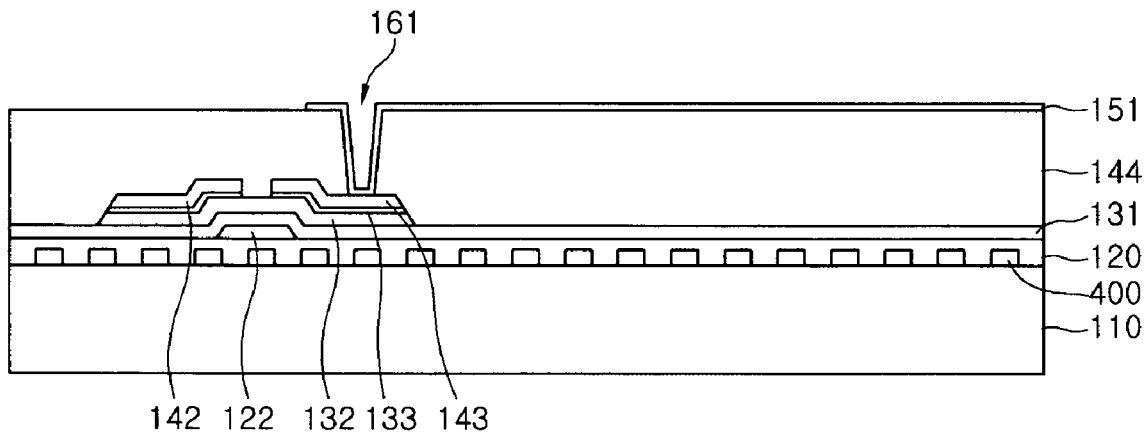

Referring to FIG. 4F, a fourth conductive layer is formed on top of the entire structure and then patterned through a photo and etching process using a sixth mask to form a pixel electrode 151. Here, it is preferred that a transparent conductive layer comprising indium tin oxide (ITO) or indium zinc oxide (IZO) be used to form the fourth conductive layer.

Although a method of manufacturing the TFT substrate 100 using six sheets of masks has been illustrated in the above, the present invention is not limited thereto but may be applied to various mask processes.

In the first embodiment of the present invention described above, the first wire grid polarizing pattern 400 is first formed on top of the substrate 110, and a process of forming the gate and data lines 121 and 141 is then performed. In this case, although the process of forming the first wire grid polarizing pattern 400 on top of the substrate 110 is added, the first wire grid polarizing pattern 400 is formed directly on a surface of the substrate 110. For this reason, the first embodiment of the present invention is a stable method since the process failures due to a step do not occur in a process, as compared with a case where the gate or data line 121 or 141 is formed and the first wire grid polarizing pattern 400 is then formed.

Hereinafter, a method of manufacturing a TFT substrate with a first wire grid polarizing pattern formed thereon according to other embodiments of the present invention will be described. Descriptions overlapping with the first embodiment of the present invention will be omitted, and only those features that are different from the first embodiment of the present invention will be described.

Figure 5A:
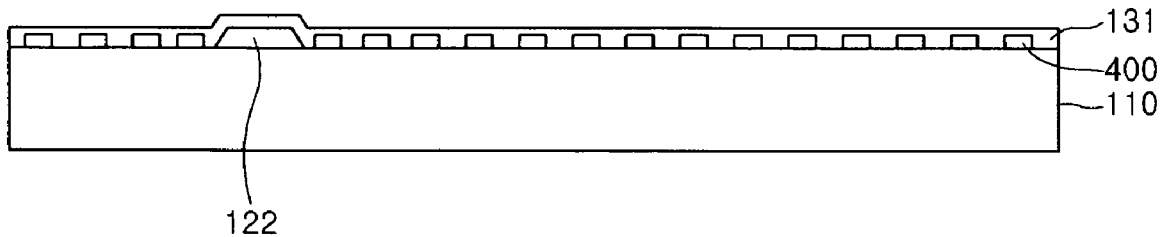
FIGS. 5A and 5B are sectional views sequentially illustrating a method of manufacturing a TFT substrate with a first wire grid polarizing pattern formed thereon according to a second embodiment of the present invention.
Figure 5B:
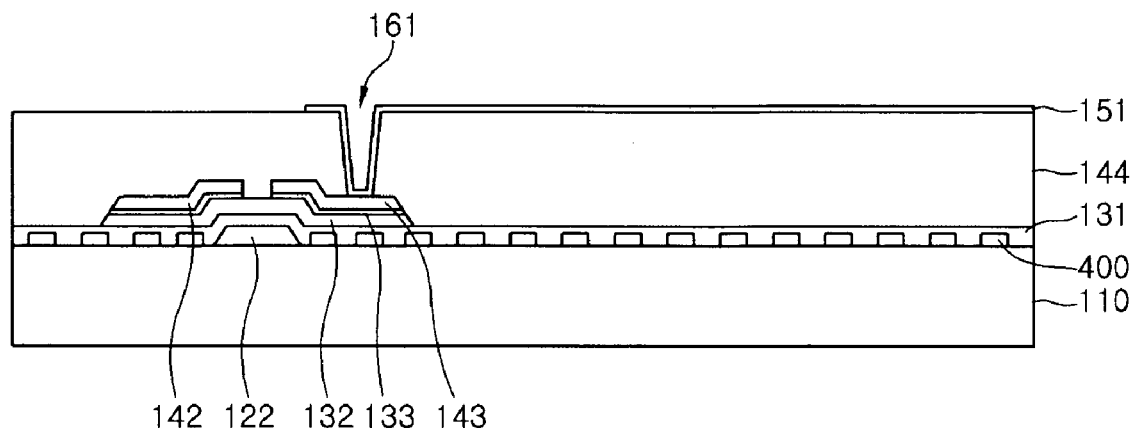

FIGS. 5A and 5B are sectional views sequentially illustrating a method of manufacturing a TFT substrate with a first wire grid polarizing pattern formed thereon according to a second embodiment of the present invention, in which the first wire grid polarizing pattern is simultaneously formed when a gate line is formed. Accordingly, the number of processes can be reduced as compared with the first embodiment.

Referring to FIG. 5A, a first conductive layer is formed on top of a substrate 110 and then patterned through a photo and etching process using a predetermined mask. Accordingly, a gate line 121 as well as a gate electrode 122 is formed, and a first wire grid polarizing pattern 400 is simultaneously formed. Here, the gate line 121 is formed to extend in one direction, e.g., in an abscissa direction. Further, the first wire grid polarizing pattern 400 is formed to be aligned in one direction in pixel regions, e.g., in a direction parallel with or perpendicular to the gate line or in an inclined direction at a predetermined angle with respect to the gate line 121. Furthermore, a gate insulation film 131 is formed on top of the entire structure.

Referring to FIG. 5B, a data line 141 is formed, and source and drain electrodes 142 and 143 are simultaneously formed. A pixel electrode 151 in contact with the drain electrode 143 is formed in the pixel region.

Figure 6A:
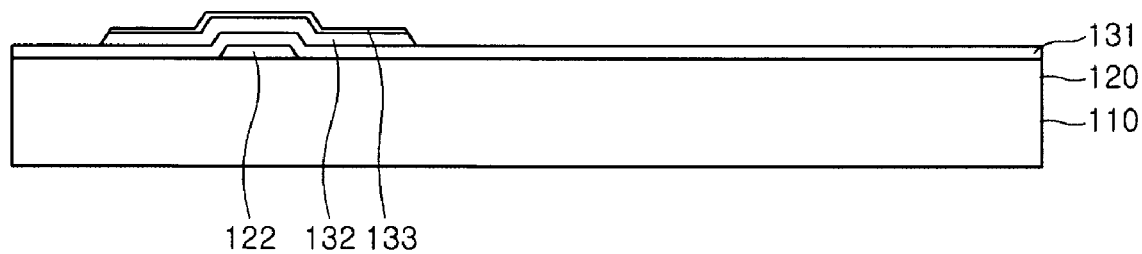
FIGS. 6A to 6C are sectional views sequentially illustrating a method of manufacturing a TFT substrate with a first wire grid polarizing pattern formed thereon according to a third embodiment of the present invention.
Figure 6B:
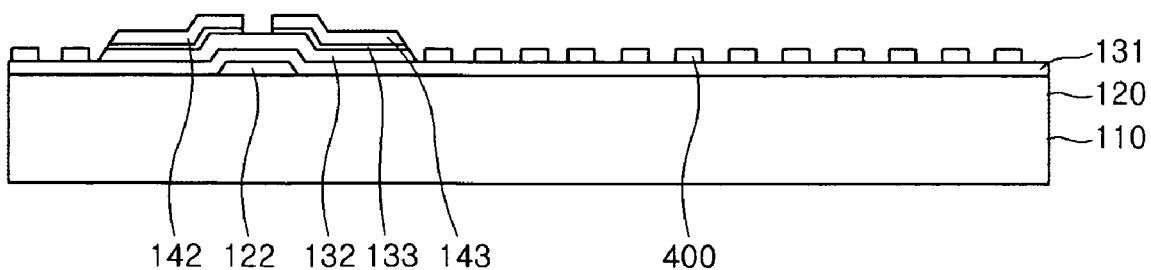
Figure 6C:
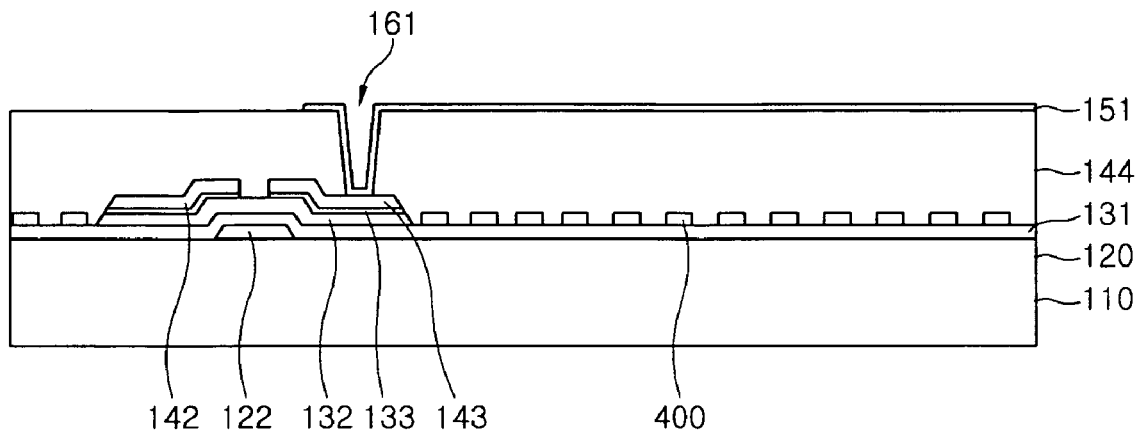

FIGS. 6A to 6C are sectional views sequentially illustrating a method of manufacturing a TFT substrate with a first wire grid polarizing pattern formed thereon according to a third embodiment of the present invention, in which the first wire grid polarizing pattern is simultaneously formed when a data line is formed. Accordingly, the number of processes can be reduced as compared with the first embodiment.

Referring to FIG. 6A, a first conductive layer is formed on top of a substrate 110 and then patterned through a photo and etching process using a predetermined mask so as to form a gate line 121 as well as a gate electrode 122. Further, a gate insulation film 131, an active layer 132 and an ohmic contact layer 133 are formed, and then the active layer 132 and the ohmic contact layer 133 are patterned to overlap with the gate electrode 121.

Referring to FIG. 6B, a second conductive layer is formed on top of the entire structure and then patterned through a photo and etching process using a predetermined mask. Accordingly, a data line 141 as well as source and drain electrodes 142 and 143 is formed, and a first wire grid polarizing pattern 400 is simultaneously formed. Here, the data line 141 is formed to extend in a direction perpendicular to the gate line 121. Further, the first wire grid polarizing pattern 400 is formed to be aligned in one direction in a pixel region defined by the gate and data lines 121 and 141, e.g., in a direction parallel with or perpendicular to the gate line 121 or in an inclined direction at a predetermined angle with respect to the gate line 121.

Referring to FIG. 6C, a protection film 144 is formed on top of the entire structure, and a contact hole 161 exposing a predetermined region of the drain electrode 143 is then formed through a photo and etching process using a predetermined mask. Then, a pixel electrode 151 in contact with the drain electrode 143 is formed in the pixel region.

According to the aforementioned second and third embodiments, in a case where the first wire grid polarizing pattern 400 is formed simultaneously with the gate or data line 121 or 141, an additional process for forming the first wire grid polarizing pattern 400 is not added. Since processes of patterning the first wire grid polarizing pattern 400 and forming an insulation film 120 are omitted, as compared with the first embodiment, the number of processes can be reduced.

In the aforementioned method of manufacturing a TFT substrate with the first wire grid polarizing pattern formed thereon according to the first to third embodiments, the first wire grid polarizing pattern is formed with a line width and interval of about 50 to 200 nm. However, since the line width and interval of such a wire grid polarizing pattern is as narrow as a nano scale, it is considerably difficult to form the wire grid polarizing pattern. Accordingly, the first wire grid polarizing pattern is primarily and secondarily formed in a double layer, so that the line width and interval of the first wire grid polarizing pattern can be more precisely controlled and the process yield of manufacturing the first wire grid polarizing pattern can be enhanced. Hereinafter, such embodiments will be described in detail. Descriptions overlapping with the aforementioned embodiments will also be omitted herein.

Figure 7A:
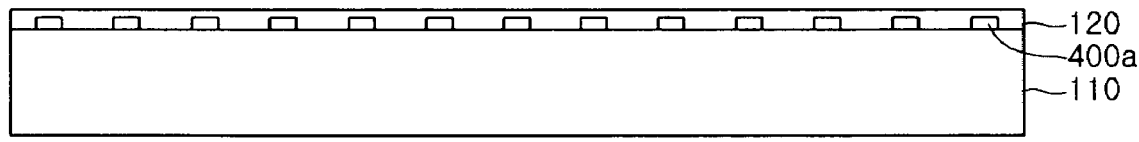
FIGS. 7A to 7C are sectional views sequentially illustrating a method of manufacturing a TFT substrate with a first wire grid polarizing pattern formed thereon according to a fourth embodiment of the present invention.
Figure 7B:
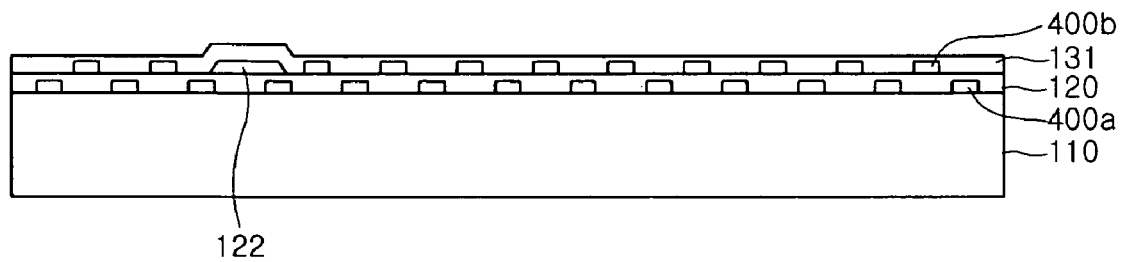
Figure 7C:
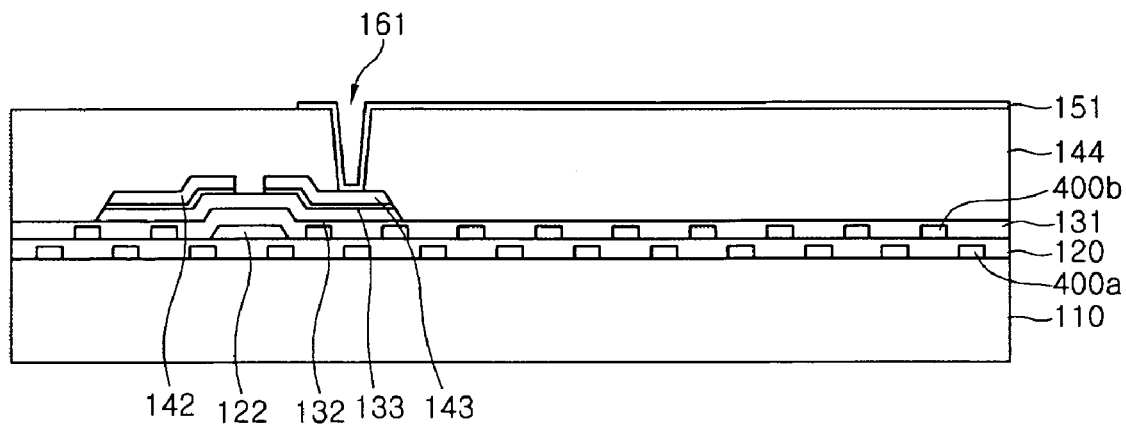

FIGS. 7A to 7C are sectional views sequentially illustrating a method of manufacturing a TFT substrate with a first wire grid polarizing pattern formed thereon according to a fourth embodiment of the present invention, in which the first wire grid polarizing pattern is primarily formed on top of a substrate before a gate line is formed, and secondarily formed simultaneously with the gate line.

Referring to FIG. 7A, a first conductive layer is formed on top of a substrate 110 and then patterned through a photo and etching process using a predetermined mask so as to primarily form a first wire grid polarizing pattern 400*a* with a predetermined line width and interval. At this time, the interval between regions in which the primarily formed first wire grid polarizing pattern 400*a* is formed should be wider than a finally desired interval. For example, the interval between the regions in which the first wire grid polarizing pattern 400*a* is formed is twice or more than the finally desired interval. Further, an insulation film 120 is formed on top of the substrate 110 with the first wire grid polarizing pattern 400*a* primarily formed thereon. For example, the insulation film 120 is formed of a silicone oxide film.

Referring to FIG. 7B, a second conductive layer is formed on top of the substrate 110 with the first wire grid polarizing pattern 400*a* and the insulation film 120 formed thereon and then patterned through a photo and etching process using a predetermined mask. Accordingly, a gate line 121 as well as a gate electrode 122 is formed, and a first wire grid polarizing pattern 400*b* is secondarily formed at the same time. Here, the secondarily formed first wire grid polarizing pattern 400*b* is formed in the same direction as the primarily formed first wire grid polarizing pattern 400*a*. Further, the secondarily formed first wire grid polarizing pattern 400*b* is formed on top of the insulation film 120, and the secondarily formed first wire grid polarizing pattern 400*b* is formed on the spaces between the regions in which the primarily formed first wire grid polarizing pattern 400*a* is formed. That is, the primarily formed first wire grid polarizing pattern 400*a* and the secondarily formed first wire grid polarizing pattern 400*b* formed thereon are alternately formed. Further, a gate insulation film 131 is formed on top of the entire structure.

Referring to FIG. 7C, a third conductive layer is formed, and source and drain electrodes 142 and 143 are then formed simultaneously with a data line 141 through a photo and etching process using a predetermined mask. Further, a protection film 144 is formed, and a pixel electrode 151 in contact with the drain electrode 143 is then formed.

FIGS. 8A to 8D are sectional views sequentially illustrating a method of manufacturing a TFT substrate with a first wire grid polarizing pattern formed thereon according to a fifth embodiment of the present invention, in which the first wire grid polarizing pattern is primarily formed on top of a substrate before a gate line is formed, and secondarily formed simultaneously when a data line is formed.

Figure 8A:
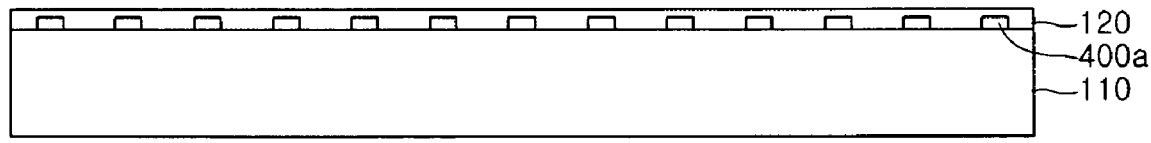
FIGS. 8A to 8D are sectional views sequentially illustrating a method of manufacturing a TFT substrate with a first wire grid polarizing pattern formed thereon according to a fifth embodiment of the present invention.

Referring to FIG. 8A, a first conductive layer is formed on top of a substrate 110 and then patterned through a photo and etching process using a predetermined mask so as to primarily form a first wire grid polarizing pattern 400*a* with a predetermined line width and interval. At this time, the interval between regions in which the primarily formed first wire grid polarizing pattern 400*a* is formed should be formed wider twice or more than a finally desired interval. Further, an insulation film 120 is formed on top of the substrate 110 with the first wire grid polarizing pattern 400a primarily formed thereon. For example, the insulation film 120 is formed of a silicone oxide film.

Figure 8B:
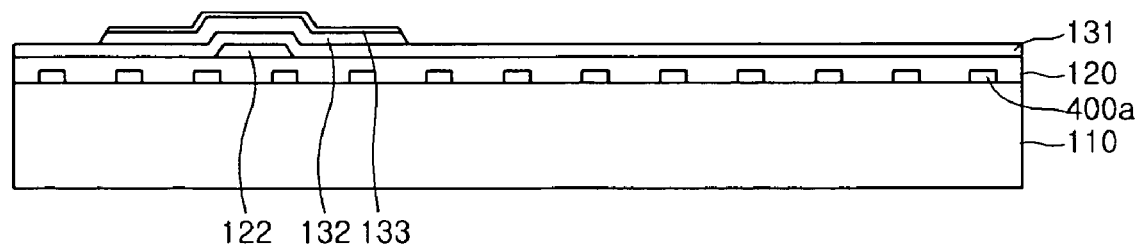

Referring to FIG. 8B, a second conductive layer is formed on the top surface of the substrate 110 and then patterned through a photo and etching process using a predetermined mask so as to form a gate line 121 as well as a gate electrode 122. Further, an active layer 132 and an ohmic contact layer 133 are formed to overlap with an gate insulation film 131 and the gate electrode 122.

Figure 8C:
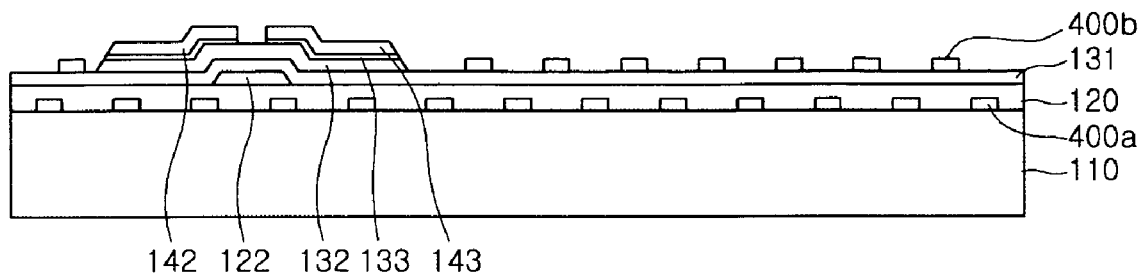

Referring to FIG. 8C, a third conductive layer is formed on top of the entire structure and then patterned through a photo and etching process using a predetermined mask. Accordingly, a data line 141 as well as source and drain electrodes 142 and 143 is formed, and a first wire grid polarizing pattern 400b is secondarily formed at the same time. Here, the secondarily formed first wire grid polarizing pattern 400b is formed in the same direction as the primarily formed first wire grid polarizing pattern 400a. Further, the secondarily formed first wire grid polarizing pattern 400b is formed on the gate insulation film 131, and the secondarily formed first wire grid polarizing pattern 400b is formed on spaces between the regions in which the primarily formed first wire grid polarizing pattern 400a is formed.

Figure 8D:
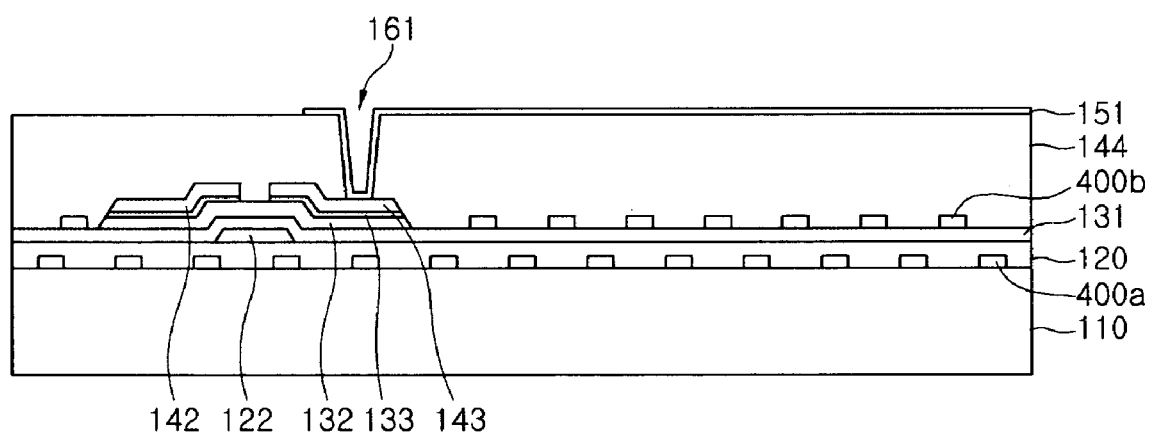

Referring to FIG. 8D, a protection film 144 is formed on the top surface of the entire structure, and a contact hole 161 exposing a predetermined region of the drain electrode 143 is then formed through a photo and etching process using a predetermined mask. Then, a pixel electrode 151 contacted with the drain electrode 143 is formed in a pixel region.

FIGS. 9A to 9D are sectional views sequentially illustrating a method of manufacturing a TFT substrate with a first wire grid polarizing pattern formed thereon according to a sixth embodiment of the present invention, in which the first wire grid polarizing pattern is primarily formed simultaneously with a gate line, and secondarily formed simultaneously with a data line.

Figure 9A:
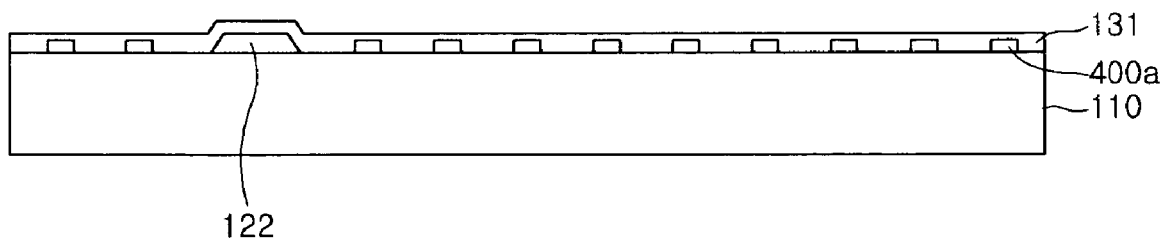
FIGS. 9A to 9D are sectional views sequentially illustrating a method of manufacturing a TFT substrate with a first wire grid polarizing pattern formed thereon according to a sixth embodiment of the present invention.

Referring to FIG. 9A, a first conductive layer is formed on top of a substrate 110 and then patterned through a photo and etching process using a predetermined mask. Accordingly, a gate line 121 as well as a gate electrode 122 is formed, and a first wire grid polarizing pattern 400a is primarily formed at the same time. Here, the gate line 121 is formed in one direction, e.g., in an abscissa direction. Further, the interval between regions in which the primarily formed first wire grid polarizing pattern 400a is formed is wider than a finally desired interval. Then, a gate insulation film 131 is formed on top of an entire surface of the substrate 110 with the primarily formed first wire grid polarizing pattern 400a formed thereon.

Figure 9B:
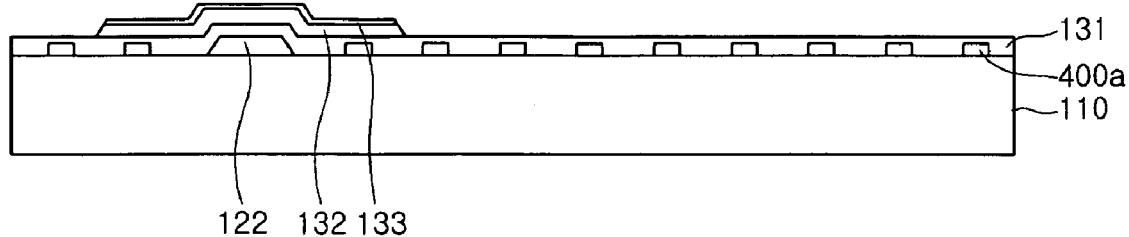

Referring to FIG. 9B, an active layer 132 and an ohmic contact layer 133 are formed on a top surface of an entire surface and then patterned to overlap with the gate electrode 122 through a photo and etching process using a predetermined mask.

Figure 9C:
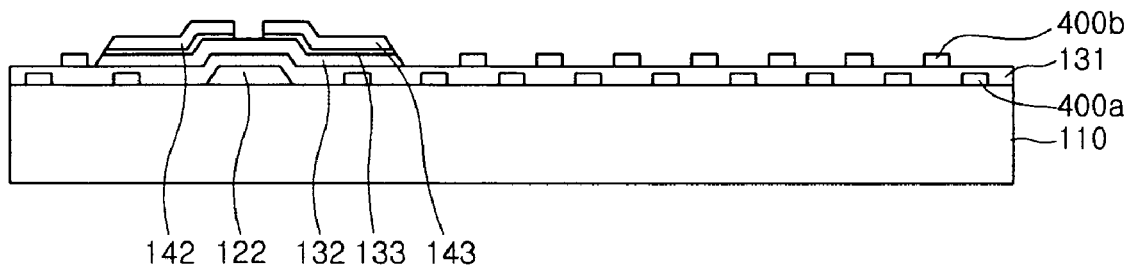

Referring to FIG. 9C, a second conductive layer is formed on the top surface of the entire structure and then patterned through a photo and etching process using a predetermined mask. Accordingly, a data line 141 as well as source and drain electrodes 142 and 143 is formed, and at the same time, a first wire grid polarizing pattern 400b is secondarily formed. Here, the secondarily formed first wire grid polarizing pattern 400b is formed in the same direction as the primarily formed first wire grid polarizing pattern 400a. Further, the secondarily formed first wire grid polarizing pattern 400b is formed on the gate insulation film 131, and the secondarily formed first wire grid polarizing pattern 400b is formed on spaces between regions in which the primarily formed first wire grid polarizing pattern 400a is formed.

Figure 9D:
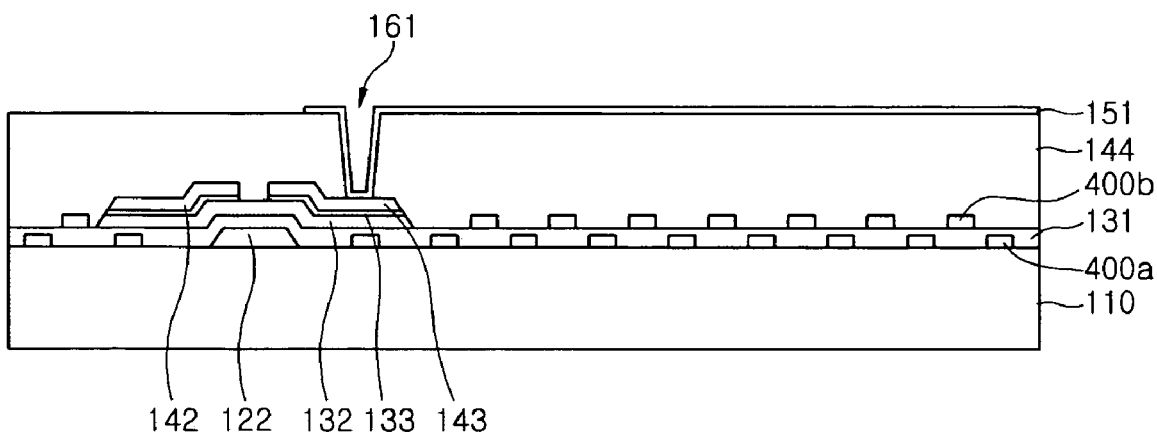

Referring to FIG. 9D, a protection film 144 is formed on the top surface of the entire structure, and a contact hole 161 exposing a predetermined region of the drain electrode 143 is then formed through a photo and etching process using a predetermined mask. Then, a pixel electrode 151 in contact with the drain electrode 143 is formed in a pixel region.

If the first wire grid polarizing pattern is formed in a multiple layer structure having upper and lower layers as the aforementioned fourth to sixth embodiments, the line width and interval of the first wire grid polarizing pattern can be precisely controlled and reduced as compared with a single layer structure. Therefore, light emitted from a backlight unit can be prevented from leaking in an outer portion of the first wire grid polarizing pattern.

As described above, the embodiments of forming the first wire grid polarizing pattern 400 on the TFT transistor substrate 100 have been described. Hereinafter, embodiments of forming a second wire grid polarizing pattern 500 on a color filter substrate 200 will be described.

Figure 10A:
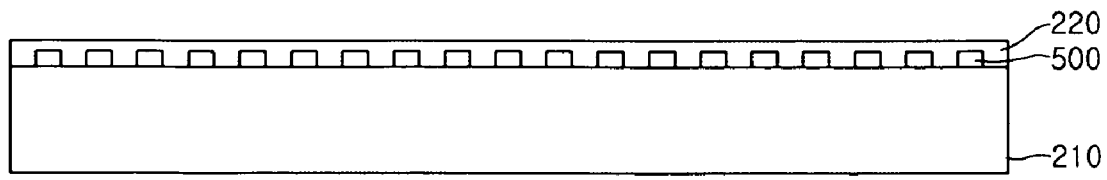
FIGS. 10A to 10C are sectional views sequentially illustrating a method of manufacturing a color filter substrate with a second wire grid polarizing pattern formed thereon according to a first embodiment of the present invention.
Figure 10B:
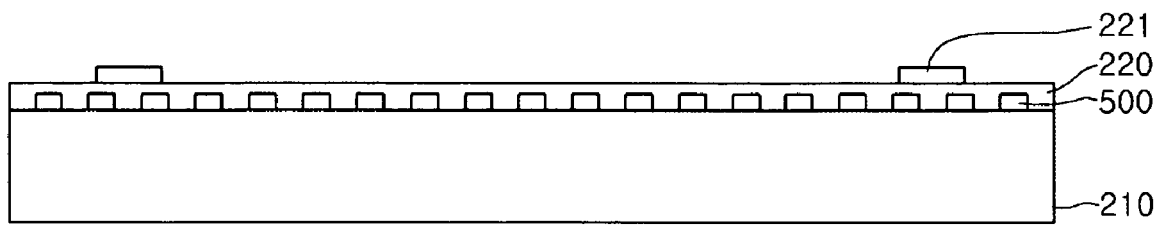
Figure 10C:
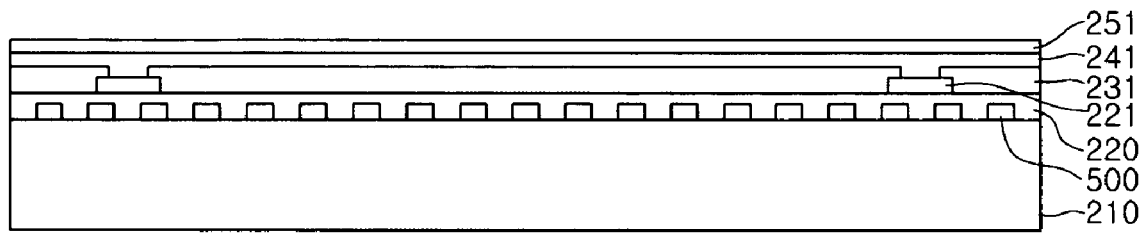

FIGS. 10A to 10C are sectional views sequentially illustrating a method of manufacturing a TFT substrate with a second wire grid polarizing pattern formed thereon according to a first embodiment of the present invention, in which the second wire grid polarizing pattern is formed on top of a substrate before the black matrix is formed.

Referring to FIG. 10A, a first conductive layer is formed on top of a substrate 210 and then patterned through a photo and etching process using a predetermined mask so as to form a second wire grid polarizing pattern 500 with a predetermined line width and interval. Here, a metallic or nonmetallic material including Al or other reflection materials is used to form the first conductive layer for the second wire grid polarizing pattern 500. Preferably, the second wire grid polarizing pattern 500 is formed on an entire surface of the substrate 210, and formed to be aligned in the direction perpendicular to the first wire grid polarizing pattern 400. Further, an insulation film 220 is formed on top of the substrate 210 with the second wire grid polarizing pattern 500 formed thereon. For example, the insulation film 220 is formed of a silicone oxide film.

Referring to FIG. 10B, a second conductive layer is formed on top of the entire surface of the substrate with the second wire grid polarizing pattern 500 and the insulation film 220 formed thereon and then patterned through a photo and etching process using a predetermined mask so as to form a black matrix 221. The second conductive layer for forming the black matrix 221 comprises Cr or CrO. Further, the black matrix 221 is formed at portions corresponding to a gate line 121 and a data line 141 and a TFT 125 of a TFT substrate 100.

Referring to FIG. 10C, red, green and blue resists are sequentially applied on top of the substrate 210 with the black matrix 221 formed thereon and then patterned to form color filters 231 sequentially aligned in the black matrix. Further, an overcoat film 241 is formed on top of the entire structure. The overcoat film 241 serves to not only protect the color filters 231 while flattening the color filters 231 but also electrically insulate the black matrix 221 and a common electrode 251, which are formed of a conductive material. Further, the overcoat film 241 is formed of an acryl based epoxy material. Thereafter, a transparent conductive layer including an ITO or IZO film is formed on top of the entire structure so as to form the common electrode 251.

In the foregoing embodiment, it has been described that the second wire grid polarizing pattern 500 is formed on top of the substrate 210 before the black matrix 231 is formed. In this case, although a process of forming the second wire grid polarizing pattern 500 on top of the substrate 210 is added, the second wire grid polarizing pattern 500 is formed directly on top of the substrate 210. For this reason, process failures due to the step do not occur. Therefore, the first embodiment of the present invention is a stable method as compared with a case where the second wire grid polarizing pattern 500 is formed simultaneously with the black matrix.

Hereinafter, a method of manufacturing a color filter substrate with a second wire grid polarizing pattern formed thereon according to other embodiments of the present invention will be described. Descriptions overlapping with the first embodiment of the present invention will be omitted, and the descriptions different from the first embodiment of the present invention will be described in priority.

Figure 11A:
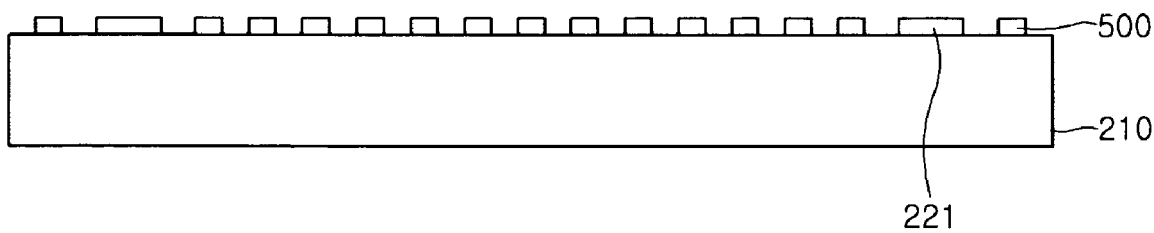
FIGS. 11A and 11B are sectional views sequentially illustrating a method of manufacturing a color filter substrate with a second wire grid polarizing pattern formed thereon according to a second embodiment of the present invention.
Figure 11B:
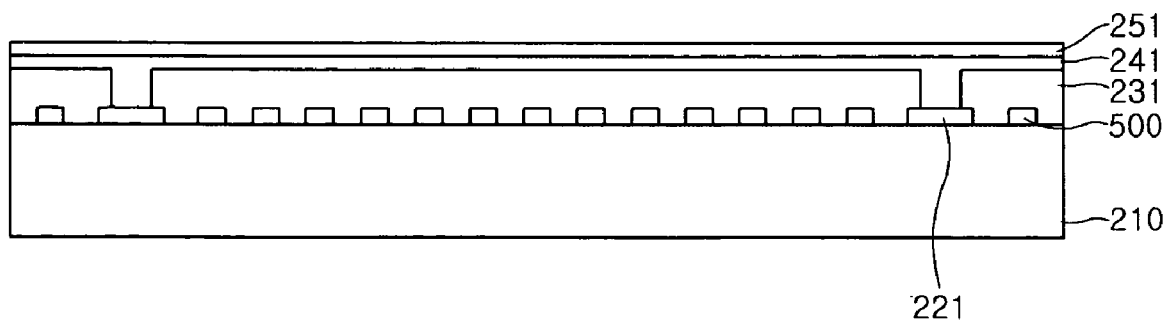

FIGS. 11A and 11B are sectional views sequentially illustrating a method of manufacturing a TFT substrate with a second wire grid polarizing pattern formed thereon according to a second embodiment of the present invention, in which the second wire grid polarizing pattern is formed simultaneously with a black matrix.

Referring to FIG. 11A, a conductive layer is formed on top of a substrate 210 and then patterned through a photo and etching process using a predetermined mask. Accordingly, a black matrix 221 is formed, and a second wire grid polarizing pattern 500 is simultaneously formed. Here, the conductive layer for forming the black matrix 221 and the second wire grid polarizing pattern 500 comprises Cr or CrO. Further, the black matrix 221 is formed at portions corresponding to a gate line 121, a data line 141 and a TFT 125 of a TFT substrate 100, and the second wire grid polarizing pattern 500 is formed in the direction perpendicular to the first wire grid polarizing pattern 400 in a region corresponding thereto.

Referring to FIG. 11B, red, green and blue resists are sequentially applied on top of the substrate 210 with the black matrix 221 and the second wire grid polarizing pattern 500 formed thereon, and then patterned to form color filters 231 sequentially aligned in the black matrix 221. Further, an overcoat film 241 is formed on top of the entire structure, and a transparent conductive layer comprising an ITO or IZO film is then formed on top of the entire structure so as to form a common electrode 251.

Figure 12A:
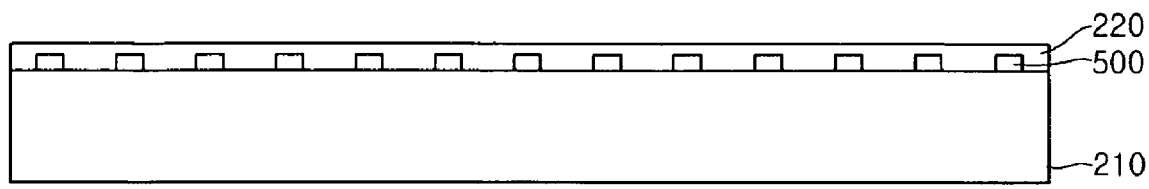
FIGS. 12A to 12C are sectional views sequentially illustrating a method of manufacturing a color filter substrate with a second wire grid polarizing pattern formed thereon according to a third embodiment of the present invention.
Figure 12B:
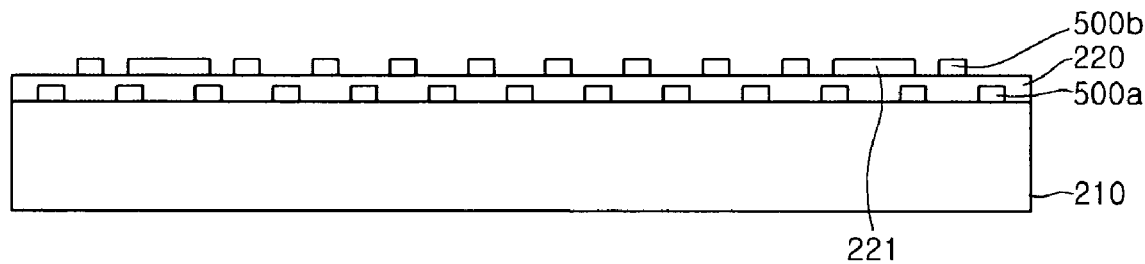
Figure 12C:
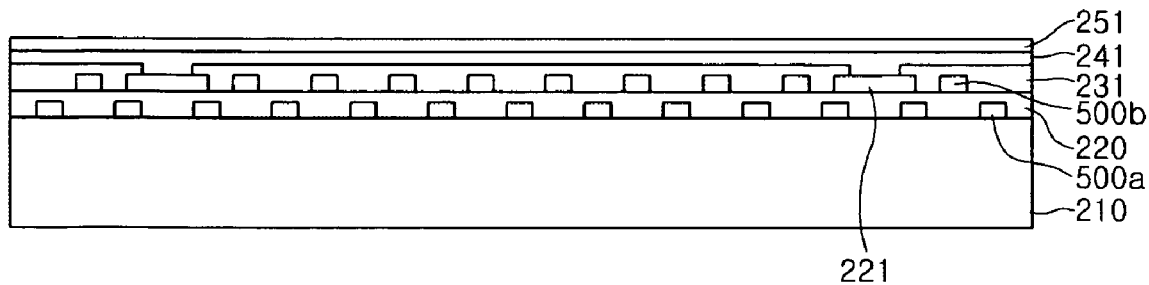

FIGS. 12A to 12C are sectional views sequentially illustrating a method of manufacturing a TFT substrate with a second wire grid polarizing pattern formed thereon according to a third embodiment of the present invention, in which the second wire grid polarizing pattern is primarily formed before a black matrix is formed, and secondarily formed simultaneously with the black matrix.

Referring to FIG. 12A, a first conductive layer is formed on top of a substrate 210 and then patterned through a photo and etching process using a predetermined mask so as to primarily form a second wire grid polarizing pattern 500a with a predetermined line width and interval. At this time, the interval between regions in which the primarily formed second wire grid polarizing pattern 500a is formed is wider than a finally desired interval. Further, an insulation film 220 is formed on top of the substrate 210 with the second wire grid polarizing pattern 500a primarily formed thereon. For example, the insulation film 220 is formed of a silicone oxide film.

Referring to FIG. 12B, a second conductive layer is formed on a top surface of the insulation film 220 and then patterned through a photo and etching process using a predetermined mask. Accordingly, a black matrix 221 is formed, and a second wire grid polarizing pattern 500b is secondarily formed at the same time. Here, the conductive layer for the black matrix 221 and the secondarily formed second wire grid polarizing pattern 500b comprises Cr or CrO. Further, the secondarily formed second wire grid polarizing pattern 500b is formed on top of the insulation film 220, and the secondarily formed second wire grid polarizing pattern 500b is formed on spaces between the regions in which the primarily formed second wire grid polarizing pattern 500a is formed.

Referring to FIG. 12C, red, green and blue resists are sequentially applied on top of the substrate 210 with the black matrix 221 and the second wire grid polarizing pattern 500 formed thereon, and then patterned to form color filters 231 sequentially aligned in the black matrix 221. Further, an overcoat film 241 is formed on top of the entire structure, and a transparent conductive layer comprising an ITO or IZO film is then formed on top of the entire structure so as to form a common electrode 251.

In the aforementioned embodiments, an LCD has been described, in which the gate and data lines 121 and 141 and the pixel electrode 151 are formed on the TFT substrate 100, and the black matrix 221, the color filters 231 and the common electrode 251 are formed on the color filter substrate 200. However, the present invention is not limited thereto but may be applied to both various liquid crystal cell structures and various pixel forms. For example, in a case where the black matrix 221 is formed on top of the TFT substrate 100, the present invention can be applied to all the methods of manufacturing LCD panels, including a case where the common electrode 251 is formed on the TFT substrate 100.

As described above, according to the present invention, a wire grid polarizing pattern is formed on at least one substrate of TFT and color filter substrates. Accordingly, the thickness of an LCD panel can be reduced as compared with a method of attaching an existing polarizer to the LCD panel. Further, a wire grid polarizing pattern is formed simultaneously in a process of forming a structure of a TFT or color filter substrate, so that the wire grid polarizing pattern can be built in an LCD panel without increasing the number of masking processes.

It will be apparent that those skilled in the art can make various modifications and changes thereto without, however, departing from the spirit and scope of the invention.

What is claimed is:
1. A liquid crystal display (LCD), comprising:
 a thin film transistor (TFT) substrate having a gate line extending in one direction on a first substrate, a data line extending in a direction perpendicular to the gate line and a pixel electrode at a pixel region defined by the gate and data lines; and
 a color filter substrate having a black matrix formed to correspond to a region except the pixel region on a second substrate, a color filter formed corresponding to the pixel region and a common electrode,
 wherein a first wire grid polarizing pattern is formed between the gate line and the first substrate, and
 wherein a second wire grid polarizing pattern is formed between the black matrix and the second substrate.
2. The LCD as claimed in claim 1, wherein the first to third wire grid polarizing pattern is formed of a reflection material.
3. The LCD as claimed in claim 1, wherein a third wire grid polarizing pattern is formed on the same plane as the gate line.
4. The LCD as claimed in claim 3, wherein the third wire grid polarizing pattern is formed on a space between regions in which the first wire grid polarizing pattern is formed.
5. The LCD as claimed in claim 1, further comprising a light conversion layer formed under the at least one of the upper and lower substrates.

6. The LCD as claimed in claim 1, wherein a fourth wire grid polarizing pattern formed on the same plane as the black matrix, wherein the fourth wire grid polarizing pattern is formed on a space between regions in which the second wire grid polarizing pattern is formed.

7. A liquid crystal display (LCD), comprising:
- a thin film transistor (TFT) substrate having a gate line extending in one direction on a first substrate, a data line extending in a direction perpendicular to the gate line and a pixel electrode at a pixel region defined by the gate and data lines; and
- a color filter substrate having a black matrix formed to correspond to a region except the pixel region, a color filter formed corresponding to the pixel region and a common electrode,
- wherein a first wire grid polarizing pattern is formed between the gate line and the first substrate,
- wherein a second wire grid polarizing pattern is formed on the color filter substrate,
- wherein a third wire grid polarizing pattern is formed on the same plane as the gate line, and
- wherein the third wire grid polarizing pattern is formed on a space between regions in which the first wire grid polarizing pattern is formed.

8. A liquid crystal display (LCD) comprising:
- a thin film transistor (TFT) substrate having a gate line extending in one direction on a first substrate,
- a data line extending in a direction perpendicular to the gate line and a pixel electrode at a pixel region defined by the gate and data lines; and
- a color filter substrate having a black matrix formed to correspond to a region except the pixel region, a color filter formed corresponding to the pixel region and a common electrode,
- wherein a first wire grid polarizing pattern is formed between the gate line and the first substrate,
- wherein a second wire grid polarizing pattern is formed on the color filter substrate, and
- wherein a third wire grid polarizing pattern is formed on the same plane as the gate line.

* * * * *